United States Patent
Namdeo et al.

(10) Patent No.: US 10,814,247 B2
(45) Date of Patent: Oct. 27, 2020

(54) ROTATING PACKED BED ASSEMBLY

(71) Applicant: HINDUSTAN PETROLEUM CORPORATION LTD., Mumbai (IN)

(72) Inventors: B K Namdeo, Mumbai (IN); Sri Ganesh Gandham, Bangalore (IN); S N Sheshachala, Bangalore (IN); Annaji Rajiv Kumar Tompala, Bangalore (IN)

(73) Assignee: Hindustan Petroleum Corporation, Mumbai (IN)

( * ) Notice: Subject to any disclaimer, the term of this patent is extended or adjusted under 35 U.S.C. 154(b) by 96 days.

(21) Appl. No.: 15/304,057

(22) PCT Filed: Aug. 3, 2015

(86) PCT No.: PCT/IB2015/055880
§ 371 (c)(1),
(2) Date: Oct. 13, 2016

(87) PCT Pub. No.: WO2016/038480
PCT Pub. Date: Mar. 17, 2016

(65) Prior Publication Data
US 2017/0028311 A1  Feb. 2, 2017

(30) Foreign Application Priority Data
Sep. 9, 2014  (IN) .......................... 2868/MUM/2014

(51) Int. Cl.
*B01D 3/30* (2006.01)
*B01D 53/18* (2006.01)
(Continued)

(52) U.S. Cl.
CPC ............. *B01D 3/30* (2013.01); *B01D 53/185* (2013.01); *B01F 3/04617* (2013.01);
(Continued)

(58) Field of Classification Search
CPC ........ B01D 3/30; B01D 53/185; B01D 47/14; B01D 47/16; B01D 45/12; B01D 45/14;
(Continued)

(56) References Cited

U.S. PATENT DOCUMENTS 2,281,616 A * 5/1942 Placek ................ B01F 7/00766
261/83
2,313,546 A * 3/1943 Hickman ................ B01D 3/30
202/205

(Continued)

FOREIGN PATENT DOCUMENTS

EP  0204193 A2  12/1986

OTHER PUBLICATIONS

Colucci et al. "Shaft Design and Fabriction" published Oct. 7, 2011 accessed at <http://www.linacolucci.com/portfolio/shaft-design-and-fabrication/> Year: 2011).*

(Continued)

*Primary Examiner* — Stephen Hobson
(74) *Attorney, Agent, or Firm* — Kinney & Lange, P.A.

(57) ABSTRACT

A rotor for rotating packed bed units (RPBs) is described. The rotor comprises a first plate and a second plate. The rotor further comprises a plurality of sets of rings concentrically interposed between the first plate and the second plate. Each set of rings comprises a plurality of rings are arranged cylindrically. Further, each ring comprises a plurality of packing elements. The rotor further comprises at least one metallic ring interposed between the plurality of sets of rings.

7 Claims, 6 Drawing Sheets

(51) Int. Cl.
  *B01F 3/04* (2006.01)
  *B01D 45/12* (2006.01)
  *B01D 45/14* (2006.01)
  *B01D 47/14* (2006.01)
  *B01D 47/16* (2006.01)
  *B01J 19/18* (2006.01)
  *B01J 19/32* (2006.01)

(52) U.S. Cl.
  CPC ............. *B01D 45/12* (2013.01); *B01D 45/14* (2013.01); *B01D 47/14* (2013.01); *B01D 47/16* (2013.01); *B01J 19/1806* (2013.01); *B01J 19/32* (2013.01); *B01J 2219/32279* (2013.01)

(58) Field of Classification Search
  CPC ......... B01F 3/04617; B01J 2219/32279; B01J 19/1806; B01J 19/32
  See application file for complete search history.

(56) References Cited

U.S. PATENT DOCUMENTS

| | | | | |
|---|---|---|---|---|
| 3,221,985 A * | 12/1965 | Burdett | ................... | B04B 5/06 494/22 |
| 3,486,743 A | 12/1969 | Todd | | |
| 3,809,375 A * | 5/1974 | Bonnet | ................... | B01D 3/30 261/87 |
| 4,283,255 A * | 8/1981 | Ramshaw | ................ | B01D 3/30 159/6.1 |
| 4,382,045 A * | 5/1983 | Wem | ................... | B01J 19/0066 261/89 |
| 4,382,900 A * | 5/1983 | Wem | ................... | B01F 3/04773 261/89 |
| 4,400,275 A * | 8/1983 | Ramshaw | .......... | B01D 11/0461 210/321.68 |
| 4,731,159 A * | 3/1988 | Porter | ................... | B01D 3/08 159/6.1 |
| 5,363,909 A * | 11/1994 | Acharya | ................ | B01D 3/30 165/111 |
| 7,429,288 B2 * | 9/2008 | Gardner | ................ | B01D 1/14 261/89 |
| 7,649,024 B2 * | 1/2010 | Li | ............... | B01J 8/10 508/165 |
| 8,702,071 B2 * | 4/2014 | Mello | ................ | B01D 53/185 261/118 |
| 10,213,759 B2 * | 2/2019 | Bystrom | ........... | B01J 19/1806 |
| 2004/0015003 A1 * | 1/2004 | Yang | ................... | C01B 7/0706 558/207 |
| 2006/0090647 A1 * | 5/2006 | Lin | ................... | B01D 47/16 95/215 |
| 2007/0295662 A1 * | 12/2007 | Park | ................... | B01D 19/0063 210/640 |
| 2008/0267843 A1 * | 10/2008 | Burns | ................... | B01F 5/221 422/198 |
| 2011/0303088 A1 * | 12/2011 | Dutra E Mello | ........ | B01D 3/30 95/151 |
| 2012/0198999 A1 | 8/2012 | E Mello et al. | | |
| 2012/0267232 A1 * | 10/2012 | Riley | ................... | B01D 3/42 203/11 |
| 2013/0319235 A1 | 12/2013 | Wolf et al. | | |
| 2014/0047761 A1 * | 2/2014 | Mandle | ................ | B01J 19/088 44/308 |

OTHER PUBLICATIONS

International Search Report and Written Opinion dated Dec. 10, 2015, for corresponding PCT Application No. PCT/IB2015/055880.

\* cited by examiner

ROTATING PACKED BED ASSEMBLY

TECHNICAL FIELD

The present subject matter relates, in general, to a rotating packed bed assembly and, in particular, to a rotating packed bed unit having a single rotor design.

BACKGROUND

Processing units, of the type used in petroleum refining industry, are generally huge in size. Examples of such processing units include distillation columns, absorption columns, stripping columns, and contacting columns. The main reason behind huge size of the processing units is that inter-phase mass transfer rates are limited by the contact area and contact time. To overcome low mass transfer rates in the processing units, rotating packed bed (RPB) units can be used. In recent times, the RPB units have received considerable attention as a means of process intensification for gas-liquid mass transfer. The RPB units can induce centrifugal forces that are over hundred to thousand times of the gravitational force. This High Gravity driving force allows for increased throughput in the processing units, immensely improved mass transfer rates, and reduces Height Equivalent to Theoretical Plates (HETP) by about 10 to 100, all of which results in size reduction of the processing units.

A typical RPB unit is a disk-shaped porous basket with an inlet through the center of the disk and having a circular packing element fixed to a rotor. In operation, liquid phase is pumped into the center of the disk and driven outward radially by centrifugal acceleration. Further, gas phase is introduced at the outer surface of the disk and is forced radially inward, countercurrent to the liquid phase by pressure driving forces. The mass transfer between the two phases, i.e., liquid and gas, occurs within the disk. After that the product liquid and gas phases exit the RPB unit from their respective outlets. The RPB unit is generally packed to increase the surface area for mass transfer to occur. The circular packing element is also of sufficiently large surface area where the mass transfer occurs. The gas and liquid phases interact on said large surface area of the circular packing element.

BRIEF DESCRIPTION OF THE DRAWINGS

The detailed description is described with reference to the accompanying figures. In the figures, the left-most digit of a reference number identifies the figure in which the reference number first appears. The same numbers are used throughout the figures to reference the same elements.

DETAILED DESCRIPTION

Figure 1:
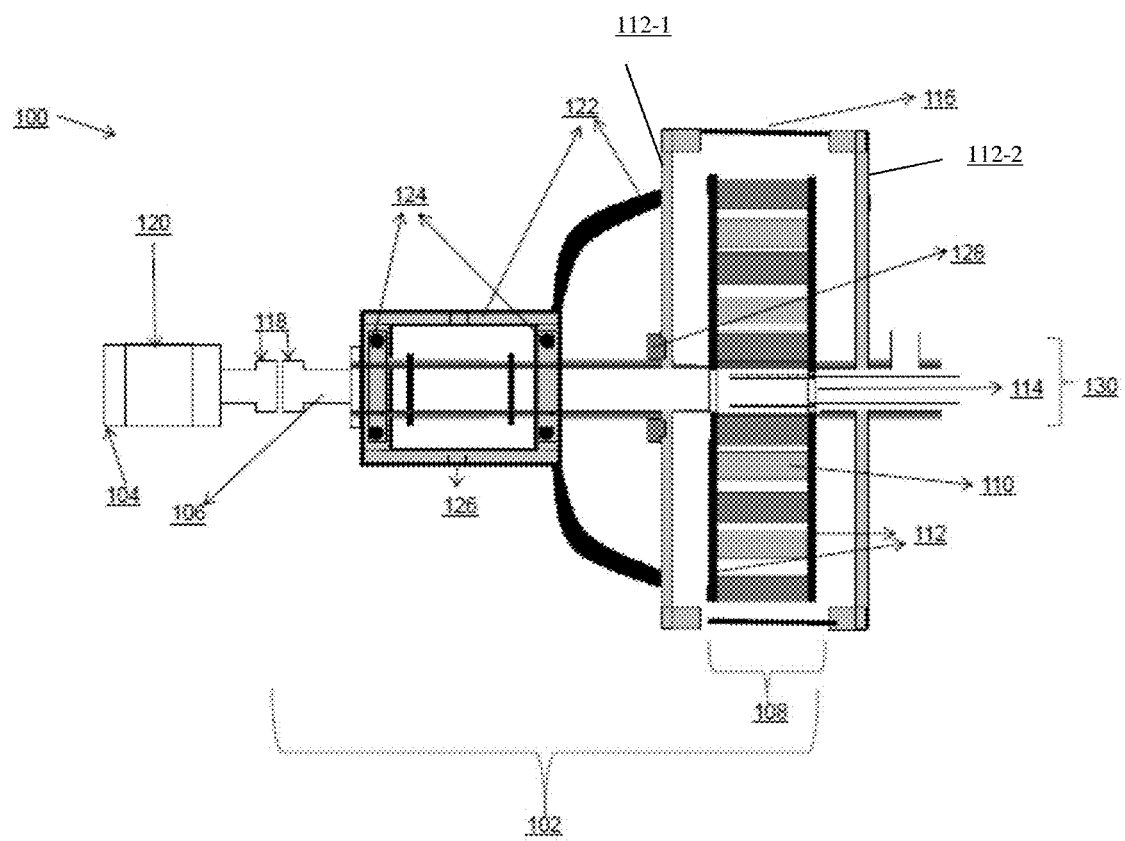
FIG. 1 illustrates a rotating packed bed assembly, in accordance with an embodiment of the present subject matter.
Figure 2A:
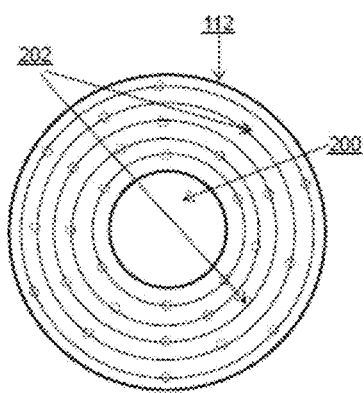
FIGS. 2(a)-2(e) illustrates one or more components of a rotor, in accordance with an embodiment of the present subject matter.
Figure 2B:
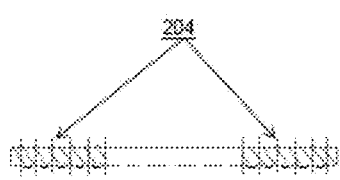
Figure 2C:
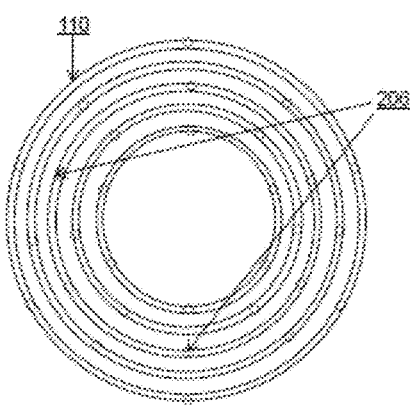
Figure 2D:
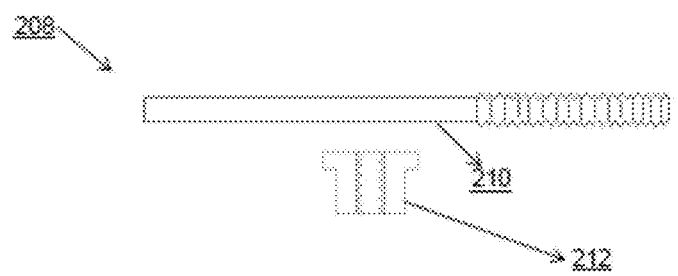
Figure 2E:
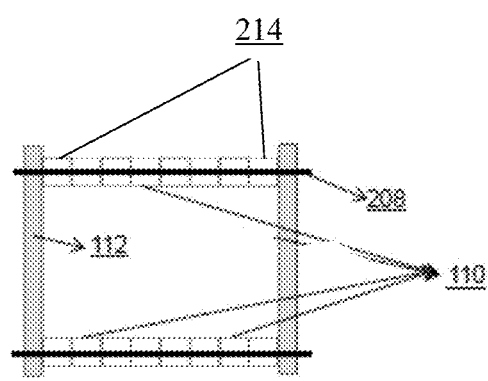

Generally, a two rotor design is used in rotating packed bed (RPB) units. The two rotor design includes a first rotor and a second rotor, each having a set of annular permeable packing elements. For example, the first rotor may include a first set of annular permeable packing elements. While, the second rotor may include a second set of annular permeable packing elements. Each set of the annular permeable packing elements comprises a plurality of concentric hollow cylinders/rings having a predefined gap amongst them. The first set of annular permeable packing elements is fixed to a first circular plate of the first rotor and the second set of annular permeable packing elements is fixed to a second circular plate of the second rotor. Further, the first circular plate includes a gap for fluid entry, whereas in the second circular plate a gap for gas exit is provided. In a known approach, the first rotor and the second rotor of the RPB unit are aligned in a manner such that the first circular plate of the first rotor and the second circular plate of the second rotor are parallel to each other. Further, the annular permeable packing elements of the first rotor are placed inside the gap between the annular permeable packing elements of the second rotor and vice versa.

In addition to the first rotor and the second rotor, the RPB unit also includes a first shaft and a second shaft for rotating the first rotor and the second rotor, respectively. The first shaft is connected to the first rotor through the gap for liquid entry provided in the first circular plate. The second shaft is connected to the second rotor through the gap for gas exit provided in the second circular plate. The first shaft is coupled to a first motor (not shown) that rotates the first shaft and hence rotates the first rotor in one direction. Similarly, the second shaft is coupled to a second motor (not shown) that rotates the second shaft and hence rotates the second rotor in either the same or an opposite direction to the direction of rotation of the first rotor.

For mass transfer operation, gas and liquid phases are fed in the RPB unit. The liquid phase is pumped through the first shaft and the gap for liquid entry. The gas phase is introduced through an outer most packing element and is forced radially inward, countercurrent to liquid phase under pressure. The first and second motors rotate the first rotor and the second rotor respectively in either co-direction or counter-direction. Due to centrifugal forces, greater contact between the liquid phase and the gas phase is achieved and therefore mass transfer takes place between the liquid phase and the gas phase. After the mass transfer, a product gas phase goes out from the gap for gas exit and the second shaft, whereas a product liquid phase goes out through an outer most packing element located at an end opposite to the outer most packing element from where the gas is inserted.

In such a setup of the RPB unit, the annular permeable packing can get significantly deflected in operation due to the high centrifugal forces and can lead to structural damages. The deflection that may be caused can be estimated empirically using various studies, such as Finite Element Method (FEM) studies, deflection analysis, and rotor dynamics studies, conducted on the conventional RPB units, such the RPB unit. These studies can include rotor modeling and FEM calculations, mechanical strength calculations of the rotor, critical speed calculations, and rotor balancing analysis. It is gathered from these studies that the conventional two rotor design has a constraint in the form of deflection of the annular permeable packing elements. More specifically, the annular permeable packing elements during rotation at high speeds, such as 500 to 5000 rpm, are subjected to very high centrifugal forces causing significant deflections at the free-end peripheries of the annular permeable packing elements. At such high centrifugal forces, any minor unbalance in the annular permeable packing elements may lead to the failure of the RPB unit during its operation due to crashing of the two sets of annular permeable packing elements and thus the non-performance of the subject process for improving mass transfer. In certain cases, the mechanical stresses generated in the first and second rotors can be more than the ultimate tensile strength of the rotor material and can lead to structural failure.

The present subject matter describes an RPB unit comprising a single rotor and a single shaft. In accordance with the present subject matter, the rotor comprises one or more sets of concentric rings of packing elements, one or more metallic rings, and one or more metallic plates. In an example, the concentric rings of packing elements are stacked together to achieve a desired length of the rotor. In said example, each of the packing elements has a high surface area. The metallic rings may be placed intermediary to the concentric rings at regular or variable intervals. Further, the two metallic plates may be connected to either side of the concentric rings of packing elements to achieve a desired level of sturdiness for the rotor. The aforementioned arrangement of the rotor results in a robust and sturdy setup and the deflections amongst the concentric rings of packing elements is minimized.

In operation, the RPB unit facilitates mass transfer between a liquid and a gas. In an example, one or more liquid distribution nozzles pump the liquid into the center of the rotor. In said example, the gas is introduced radially inward to the rotor through an outermost ring of the packing elements. The gas and the liquid interact on the surface area of the packing elements and result in the mass transfer. Due to the centrifugal acceleration produced by the rotation of the rotor, the liquid is driven outward radially from the rotor. In the RPB unit, a gas outlet is provided for allowing the gas to exit.

The following detail description describes the RPB unit and its uses in detail. While aspects of the RPB unit bed can be implemented in any number of different applications, the RPB unit as per the present subject matter is described in the context of the following exemplary embodiments.

FIG. 1 illustrates an RPB assembly 100, in accordance with an embodiment of the present subject matter. The RPB assembly 100 comprises an RPB unit 102 and a motor 104. The RPB unit 102 facilitates mass transfer between a liquid and a gas. In an example, the RPB unit 102 includes a shaft 106 and a rotor 108.

The shaft 106 may be a low weight metallic hollow drive shaft. The rotor 108 includes one or more sets 110 of concentric rings of packing elements, stacked together in a manner as shown in the Figure. In an example, the sets 110 may be aligned in a manner such that a center of each set is aligned along an imaginary straight axis. The rotor 108 may also include one or more sets of metallic rings 214. In an implementation, the sets of metallic rings 214 may be placed in between the sets 110 of the concentric rings at regular or variable intervals. Placement of the metallic rings 214 in between the sets 110 of the concentric rings helps in achieving a desired stiffness or mechanical strength of the rotor 108. As a result fatigue in the rotor 108 is reduced.

The rotor 108 further includes one or more metallic plates 112-1 and 112-2, hereinafter individually referred to as the metallic plate 112 and collectively referred to as the metallic plates 112. In an example, the metallic plates 112 may be circular in shape. The metallic plate 112-1 may also be referred to as a base metallic plate 112-1 and the metallic plate 112-2 may also be referred to as a top metallic plate 112-2. In an example, the metallic plates 112, the sets 110 of the concentric rings and the metallic rings 214 may be stacked together using a plurality of fasteners, such as a tie-rod. Further, the top metallic plate 112-2 may have a gap 114 for facilitating inflow of the liquid and the outflow of the gas. In an example, the rotor 108 may be housed inside a rotor vessel 116.

In an implementation, one end of the shaft 106 may be connected to the motor 104 through one or more removable couplings 118. The removable couplings 118 may also be referred to as the couplers 118. The motor 104 facilitates rotation of the shaft and thereby rotation of the rotor 108. In an example, a variable frequency drive 120 may be provided for controlling a speed of the motor 104. On the other end, the shaft 106 may be connected to the base metallic plate 112-1 through a flange (not shown in figure). In an example, the shaft 106 may have a plurality of sequential steps on the outer surface for facilitating mounting of a bearing housing 122 onto the shaft 106. The bearing housing 122 comprises one or more ball bearings 124 housed in the bearing 122 housing for countering the axial and radial loads of the rotor 108 which is having a cantilever arrangement. In an example, the ball bearings 124 may be deep groove ball bearings and may hold the rotor 108 in position thereby averting hanging and deflections during rotations. In order to avoid dry operation of the ball bearings 124, the bearing housing 122 may comprise an oil lubrication and breathing mechanism 126, also referred to as lubricant and cooling water circulation mechanism 126, for continuous supply of air and oil to the ball bearings 124. As a result, the life of the ball bearings 124 may be increased. The bearing housing 122 may further include one or more mechanical seals 128. In an example, the mechanical seals 128 may be connected to the shaft 106 and the rotor vessel 116 for averting any leakage of the liquid and the gas from inside the rotor vessel 116 to the outside environment. In an example, the bearing housing 122 may be equipped with a double mechanical seal i.e., two-stage leak prevention mechanism. The mechanical seals 128 may also be equipped with lubricant and cooling water circulation mechanism (not shown in the figure). Further, the mechanical seals 128 may also be equipped with a trip logic (not shown in the figure) which may trigger an alarm in case of any leakage from any of the mechanical seals 128.

In an implementation, a liquid inlet and gas outlet pipe assembly 130 may be provided for facilitating inflow of the liquid in the rotor 108 and exit of the gas from the rotor 108. In an example, the liquid inlet and gas outlet pipe assembly 130 may be connected to the rotor 108 through the gap 114. The liquid inlet and gas outlet pipe assembly 130 may comprise of a central hollow pipe, hereinafter referred to as the gas outlet pipe, which allows the gas to exit from the rotor 108 due to pressure differential. Surrounding the gas outlet pipe is a liquid inlet pipe for facilitating the inflow of the liquid. The liquid enters the rotor 108 through the annular space between the gas outlet pipe and the liquid inlet pipe. The liquid inlet and gas outlet pipe assembly 130 further comprises one or more liquid distributor pipes connected to the liquid inlet pipe for distributing the liquid inside the rotor 108. Each of the liquid distributor pipes comprises one or more nozzles through which the liquid may be distributed inside the rotor 108. In an example, the nozzles may be full cone spray nozzles. Further, a seal housing (not shown in Figure) may be provided. The seal housing comprises two stages of lip seals or oil seals, for example, polymers, and a teflon bush to prevent leak of the gas and the liquid from inside the rotor 108.

In operation, the gas may be introduced inside the rotor vessel 116 through a gas inlet nozzle provided in the rotor vessel 116. In an example, the gas may be forced radially inward to the rotor 108. The gas may be distributed inside the vessel in a homogenous manner by using a gas impingement plate. In an example, the gas impingement plate may be made of metal and may have one or more holes on its surface. The gas impingement plate may be provided on the inner surface of the rotor vessel 116 and may be suitably aligned with the gas inlet nozzle. The liquid may be introduced into the rotor 108 through the liquid distributor pipes as mentioned above.

The motor 104 rotates the shaft 106, either in clockwise or anti-clockwise direction, and thereby, in turn, rotates the rotor 108. The gas and the liquid interact with each other over the surface of the packing elements and mass transfer occurs between the two. Due to the centrifugal acceleration produced due to the rotation of the rotor 108, the liquid is driven radially outwards of the rotor 108. Further, the gas exits the rotor 108 through the gas outlet pipe.

FIG. 2(*a*) illustrates a top view of the metallic plate 112. The metallic plate 112 may have a gap 200 in the center. Further, the metallic plate 112 may comprise a plurality of slots 202 for facilitating passage of the fastener through the metallic plate. FIG. 2(*b*) illustrates a side view of the metallic plate 112. The metallic plate 112 may comprise a plurality of grooves 204 for enabling a set of metallic rings 214 to be placed onto the metallic plate 112. FIG. 2(*c*) illustrates a top view of a set 110 of concentric rings. Each ring in the set 110 may comprise a plurality of holes 206 for facilitating passage of the fastener through the concentric ring. FIG. 2(*d*) illustrates a tie-rod 208 for stacking the metallic plates 112, the sets 110 of concentric rings, and the metallic rings 214. The tie-rod 208 comprises a metallic rod 210 and a cap-nut 212. In an example, as shown in the figure, the metallic rod 210 and the cap-nut 212 may be suitably threaded for enabling fasting of the cap-nut 212 onto the metallic rod 210. FIG. 2(*e*) illustrates a cross-sectional view of the metallic plates 112, an outermost set 110 of concentric rings, and the metallic rings 214 stacked together using the tie-rod 208.

Figure 3:
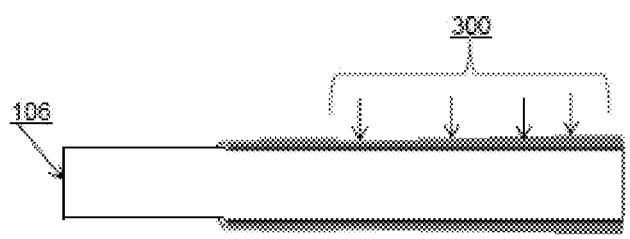
FIG. 3 illustrates a plurality of sequential steps on an outer surface of a shaft connected to the rotor, in accordance with an embodiment of the present subject matter.

FIG. 3 illustrates a plurality of sequential steps 300 on an outer surface of the shaft 106. The sequential steps 300 facilitate mounting of the bearing housing 122 onto the shaft 106.

Figure 4A:
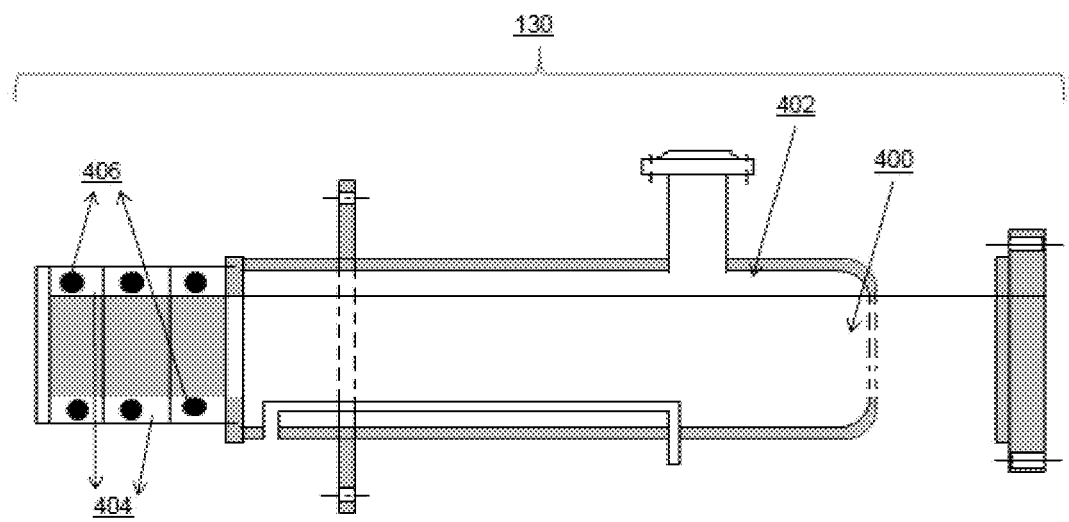
FIGS. 4(a) and 4(b) illustrates components of a liquid inlet and gas outlet pipe assembly, in accordance with an embodiment of the present subject matter.
Figure 4B:
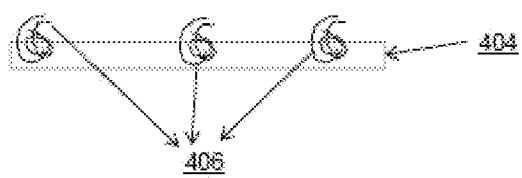

FIG. 4(*a*) illustrates components of the liquid inlet and gas outlet pipe assembly 130. The liquid inlet and gas outlet pipe assembly 130 may comprise of a central hollow pipe 400, hereinafter referred to as the gas outlet pipe 400 for allowing the gas to exit from the rotor 108 due to pressure differential. Surrounding the gas outlet pipe 400 is a liquid inlet pipe 402 for facilitating the inflow of the liquid. The liquid enters the rotor 108 through the annular space between the gas outlet pipe 400 and the liquid inlet pipe 402. The liquid inlet and gas outlet pipe assembly 130 further comprises one or more liquid distributor pipes 404 connected to the liquid inlet pipe 402 for distributing the liquid inside the rotor 108. Each of the liquid distributor pipes 404 may comprises one or more nozzles 406 through which the liquid may be distributed inside the rotor 108. In an example, the nozzles 406 may be full cone spray nozzles. FIG. 4(*b*) illustrates the liquid distributor pipe 404 and the nozzles 406.

Figure 5A:
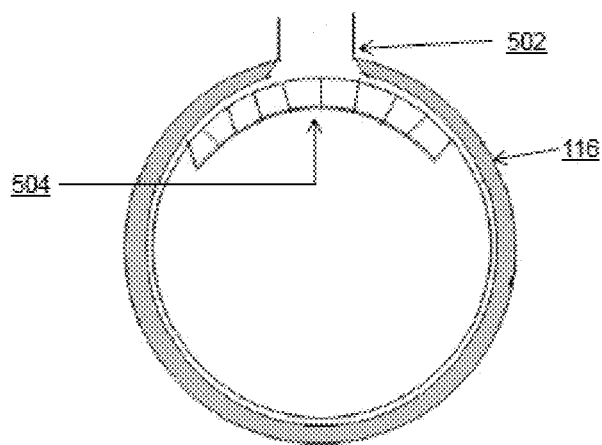
FIGS. 5(a) and 5(b) illustrates details of a nozzle for allowing passage of a gas into the rotor, in accordance with an embodiment of the present subject matter.
Figure 5B:
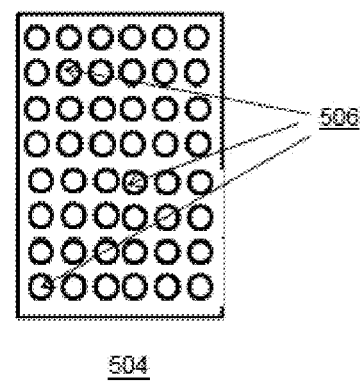

FIG. 5(*a*) illustrates a top view of the rotor vessel 116. In the figure, 502 depicts a gas inlet nozzle for introducing the gas inside the rotor vessel 116. In an example, the gas may be forced radially inward to the rotor 108. The gas may be distributed inside the vessel in a homogenous manner by using a gas impingement plate 504. The gas impingement plate 504 may be provided on the inner surface of the rotor vessel 116 and may be suitably aligned with the gas inlet nozzle 502. FIG. 5(*b*) shows a top view of the gas impingement plate 504. The gas impingement plate 504 may comprise a plurality of holes 506 for facilitating entry of the gas in the rotor vessel 116. In an example, the gas impingement plate may be made of metal.

Validation and Results

The following details have been provided for the purpose of validation of the efficiency of the present subject matter describing the RPB assembly 100.

A finite Element Method (FEM) and rotor dynamic analysis of both, the conventional two rotor RPB unit and the RPB unit 102 comprising the single rotor 108 was performed. Accordingly, a model for each of the two rotor RPB unit and the RPB unit 102 was generated based on a combination of 3D (solid), 2D (shell) and 1D (beam and rigid elements). The rotor shaft was modeled using solid tetrahedral elements. The rings and the liquid inlet and gas outlet assembly were modeled based on a combination of shell and beam elements. The beam elements are used, specifically, for modeling tie rods used for fastening the rings and the top and bottom plate and the pipes in distributor assembly (in case of liquid side rotor). Further, both the two rotor RPB unit and the RPB unit 102 were assessed with respect to static deflection and stress analysis.

The analysis result for the two rotor RPB unit is provided in the following description. The gap between any two overlapping rings, when the liquid and gas side rings are in mesh is five millimeters. The maximum deflection of the rotor on the liquid side is found to be 1.62 mm. While, the maximum deflection of the rotor on the gas side is 2.17 mm. The deflection for both gas and liquid sides are found to be very high and any imbalance in the system may lead to failure/crash of entire rotor/RPB unit.

Also, the Young's modulus of a material from which the rings of the two rotor RPB unit are prepared is very low, about 200 MPa. This results in a relatively large deformation of the rings as compared to its static deflection. Further, the tie rods in the set of rings deform along with the rings. But the deformation of the tie rods gets restricted at the intermediate and end cover rings, which are provided so as to stiffen the ring nest assembly. This results in excessive stresses on the tie rods.

The maximum deflection of the rotor is a major concern as it is close than 5 mm (which is the gap available between any two overlapping rings of the ring nest assemblies of liquid and gas side rotors in mesh). However, the stresses induced in the tie rods are very high (719 MPa for liquid side and 796 MPa for gas side) and exceed even the ultimate strength of the tie rod material which is 515 MPa. The stresses induced in the tie rods within the ring nest assembly, due to centrifugal forces, were found to be exceeding the ultimate tensile which causes the failure of tie-rods and eventually, the rotor.

Following are the analysis results for the RPB unit 102. As described in the above description, the RPB unit 102 comprises a single rotor and a single shaft. Further, the plurality of concentric rings of packing elements is stacked together between the circular metal plates of the rotor. The two metallic plates are connected to each other leading to a sturdy rotor. This arrangement of the rotor results in a robust setup and the deflections amongst the concentric rings of packing elements is avoided.

The maximum shear stress induced in the rotor for the combined bending and torsion loads is observed to be 18.2 MPa. The allowable shear stress for the shaft material works out to be 46 MPa. Hence, the factor of safety for the inlet side rotor shaft design works out to be 2.5, which is adequate for this application. Hence the shaft is safe to withstand combined loading due to shear and torsion loading.

Bearing selection criterion is generally considered as minimum life of 1 Lac hours. The Bearing life for the selected bearings is more than the 1 Lac hours. Hence bearings selection is found to in order.

The lowest critical speed obtained is about 2400. A separation margin of 20 percent is considered as a guideline in Rotor Dynamics. In the present case, the separation margin for the lowest critical speed for the rotor work is more than 100%. Therefore, from rotor dynamics point of view, the rotor is safe to operate at its operating speed.

The selection of rotor balancing quality grade is based on International Standard ISO 1940/1, which is a widely accepted reference for selecting rigid rotor balance quality. It was recommend the balancing grade of 6.3 for the rotor assembly.

During running of the rotor and with the available unbalance, it can be seen from response analysis that the rotor getting deflected by around 35 micron pk-pk at the sealing location. Hence the total deflection is estimated as 0.29 mm which is within the limits.

Although embodiments for the rotating packed bed assembly as per the present subject matter have been described in a language specific to structural features and/or applications, it is to be understood that the present subject matter is not necessarily limited to the specific features or applications described. Rather, the specific features and applications are disclosed as exemplary embodiments.

We claim:

1. A rotor for rotating packed bed (RPB) units, the rotor comprising:
   a first plate;
   a second plate, wherein the first plate and the second plate comprise a plurality of grooves;
   a plurality of metal rings concentrically mounted on the plurality of grooves;
   a plurality of sets of rings mounted on the plurality of metal rings, wherein each ring of the plurality of sets of rings comprises a plurality of packing elements;
   a fastener to fasten the first plate, the second plate, the plurality of sets of rings, and the plurality of metal rings, wherein the plurality of sets of rings, the first plate, the second plate, and the plurality of metal rings are stacked along the fastener;
   a gas nozzle inside the rotor vessel to feed the gases into the rotor vessel; and
   a gas impingement plate including a plurality of holes mounted at an exit of a gas nozzle for distributing gas in the rotor vessel.

2. The rotor as claimed in claim 1, wherein one of the first plate and the second plate is coupled to a shaft to rotate the rotor, wherein an outer surface of the shaft comprises a plurality of sequential steps tapered along a length of the outer surface.

3. A rotating packed bed (RPB) unit comprising:
   a rotor vessel comprising:
      a rotor, wherein the rotor comprises:
         a first plate;
         a second plate, wherein the first plate and the second plate comprise a plurality of grooves;
         a plurality of metal rings concentrically mounted on the plurality of grooves;
         a plurality of set of rings mounted on the plurality of metal rings, wherein each ring of the plurality of set of rings comprises a plurality of packing elements;
         a fastener to fasten the first plate, the second plate, the plurality of metallic rings, and the plurality of metallic ring, wherein the plurality of set of rings, the first plate, the second plate, and the plurality of metallic rings are stacked along the fastener;
         a gas nozzle inside the rotor vessel to feed the gases into the rotor vessel; and
         a gas impingement plate including a plurality of holes mounted at an exit of a gas nozzle for distributing gas in the rotor vessel;
      a liquid inlet and gas outlet pipe assembly coupled to the rotor, the liquid inlet and
      gas outlet pipe assembly comprising:
         a gas outlet pipe to affect expulsion of the gas from the rotor; and
         a liquid inlet pipe housing the gas outlet pipe to form a region to affect inflow of liquid into the rotor; and
      a shaft coupled to one of the first plate and the second plate of the rotor to rotate the rotor.

4. The RPB unit as claimed in claim 3, wherein the RPB unit further comprises a bearing housing mounted onto the shaft to counter at least one of a radial load and an axial load affected by the rotor, the bearing housing comprising:
   one or more ball bearings to hold the rotor in a predetermined position; and
   one or more seals coupled to the rotor vessel and the shaft to check leakage of air and gas from the rotor vessel.

5. The RPB unit as claimed in claim 4, wherein the bearing housing is configured to allow circulation of lubricant and cooling water to the one or more ball bearings.

6. The RPB unit as claimed in claim 3, wherein the liquid inlet pipe is provided with one or more liquid distributor pipes, wherein each of the one or more liquid distributor pipes comprises one or more nozzles to distribute liquid.

7. The RPB unit as claimed in claim 3, wherein a motor is coupled to the shaft to rotate the shaft.

* * * * *